Aug. 11, 1964    L. J.-M. GAMET    3,144,283
MACHINE TOOL SPINDLE BEARING ASSEMBLIES
Filed June 13, 1962    2 Sheets-Sheet 1
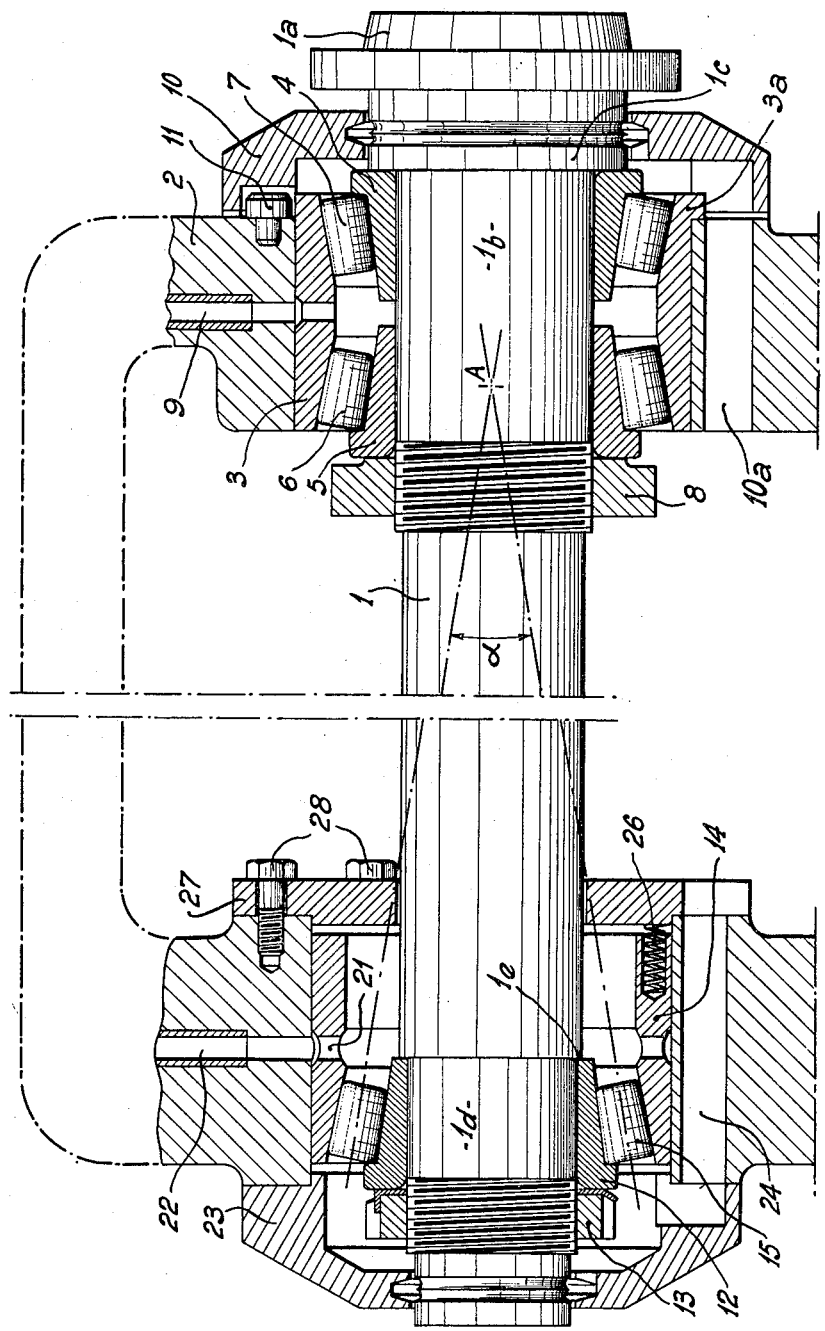
Inventor
Louis J.-M. Gamet
By Stevens, Davis, Miller & Mosher
Attorneys Aug. 11, 1964   L. J.-M. GAMET   3,144,283
MACHINE TOOL SPINDLE BEARING ASSEMBLIES
Filed June 13, 1962   2 Sheets-Sheet 2
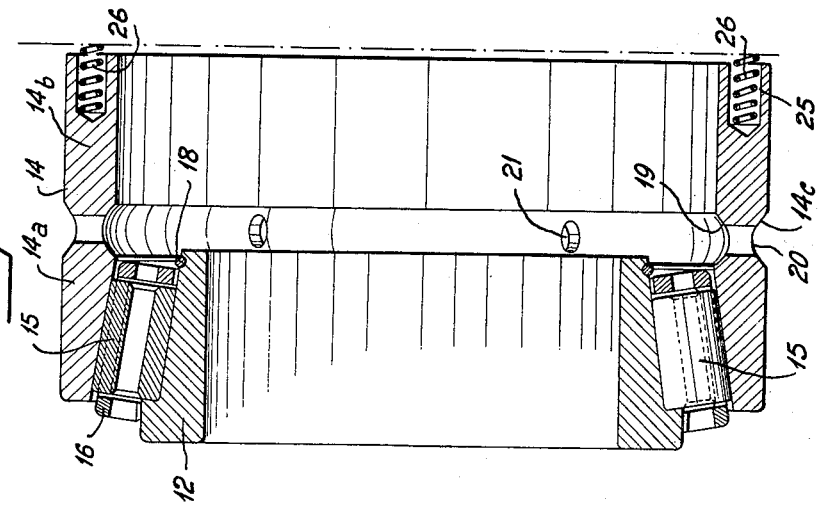
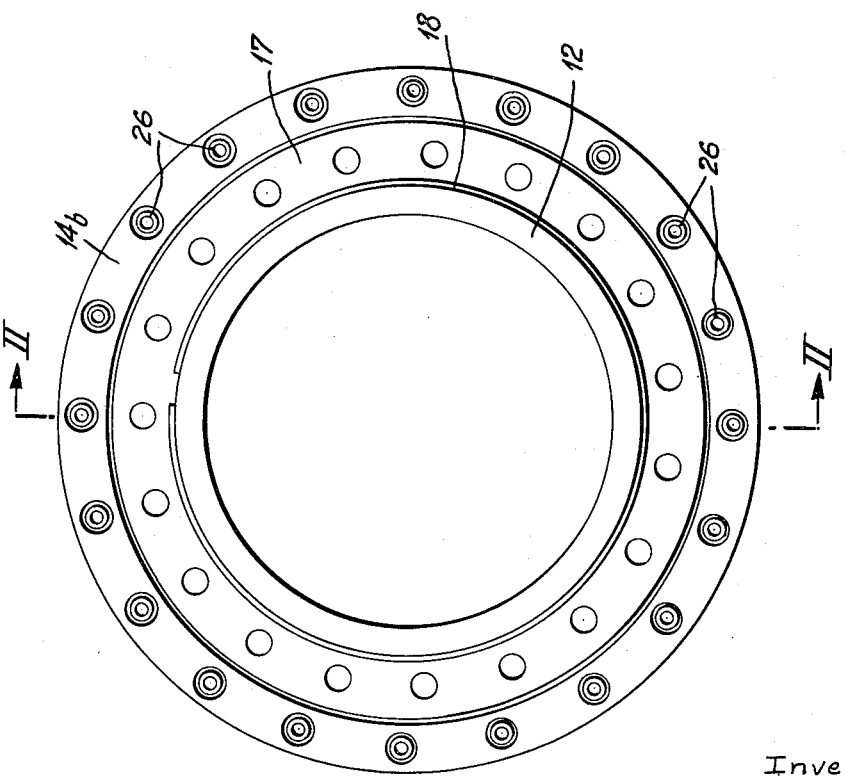
Inventor
Louis J.-M. Gamet
By Stevens, Davis, Miller & Mosher
Attorneys

United States Patent Office 3,144,283
Patented Aug. 11, 1964

3,144,283
MACHINE TOOL SPINDLE BEARING ASSEMBLIES
Louis J.-M. Gamet, Bougival, France, assignor to La Precision Industrielle Rueil-Malmaison, Seine et Oise, France, a company of France
Filed June 13, 1962, Ser. No. 202,148
Claims priority, application France June 17, 1961
6 Claims. (Cl. 308—207)

This invention relates to machine tool spindle bearing assemblies, particularly for high precision machine tools.

In high precision machine tools, the spindles thereof must revolve without any play in their bearings so as always to ensure a high quality finish, and so tapered roller bearings, in which the frusto-conical shape of the elements allows of adjustment to reduce any play due to wear when they have been in operation for some time, are widely used on machine tool spindles. Furthermore, in tapered roller bearings, the races can be moved axially to place the rollers under resilient pre-load to pre-compensate for any play. This pre-loading of the bearings also helps to compensate for play due to external causes, such as bending due to forces which are operative upon the bearings in all directions or to expansion effects.

Unfortunately, the great disadvantage of a pre-load produced by stationary means, such as by tensioning the spindle by an axial clamp nut, is that it considerably increases the internal friction of the bearings, with the result that, at high speeds, the bearing may be heated to the point of destruction as a result of excessive radial expansion of the races increasing the pre-load.

Various attempts have been made to obviate this disadvantage, including using resilient devices which maintain the pre-load at as constant a value as possible by compensating for expansion due to heating.

In a known arrangement, the spindle is carried at the chuck end by a bearing which has a double row of tapered rollers and which locates the spindle axially in both directions and which has races adjusted to have a slight running play, i.e. without pre-load. To obtain the required precision, a second tapered roller bearing is fitted at the tail end of the spindle, the outer race of the second bearing being slidable in the machine frame and being spring-loaded towards the tail end by a ring of springs. Clearly, in this arrangement, the two end races, i.e. the front race of the double bearing and the race of the single bearing, are oppositely tapered and the load applied to the outer race of the double bearing is equally distributed over the two faces. The latter, therefore, have a constant pre-load in relation to each other, and the spindle can expand or contract without significantly varying the value of the pre-load, i.e. without introducing internal play in the bearings.

The disadvantage of this proposal is that it is difficult to ensure satisfactory sliding of the outer race of the tail end bearing in the machine frame because of the unfavorable dimensional ratio between the width and the diameter of such race. In some conditions, more particularly when the tangential force produced by the spindle drive acts close to said bearing, the outer race may jam and stop sliding, so that internal play is introduced when the spindle expands longitudinally. Also, determining the clearance for sliding motion is very difficult. If the clearance is too small, it will prevent sliding; if the clearance is too large, it may cause instability because of the spindle wobbling.

The present invention has for its object to provide an improved spindle bearing assembly whereby the disadvantages above referred to may be obviated and whereby at all times and under all conditions a predetermined amount of pre-load on the bearings may be maintained.

According to the present invention, in a spindle bearing assembly comprising axially spaced oppositely tapered roller bearings the inner races of which are fixedly located on the spindle while the outer race of one of said bearings is axially slidable and urged by spring means in a direction to apply resilient pre-load to the bearings, the slidable outer race comprises a tapered part provided internally with the race surface, a cylindrical part formed with circumferentially spaced axially directed recesses to receive pressure springs, and an intermediate part of reduced mechancal strength interconnecting the tapered part and the cylindrical part.

More specifically, the invention includes a spindle bearing assembly comprising a double tapered roller bearing disposed near the working end of the spindle and whose two pairs of races widen outwards, and a second tapered roller bearing disposed near the other end of the spindle and whose races widen towards said other end, the inner race of the second bearing being secured to the spindle while the outer race is urged towards said other end by springs operative upon the periphery of said outer race, the outer race of the second bearing comprises a tapered part provided internally with a race surface, a cylindrical part formed with circumferentially spaced axially directed recesses to receive pressure springs, and an intermediate part of reduced mechanical strength interconnecting the tapered part and the cylindrical part.

This construction of the slidable outer race renders it possible to make the diameter of the outer race significantly smaller than the diameter of its seat in the machine frame by ensuring that all play will be taken up and a pre-determined pre-load maintained without any possibility of the outer race jamming in its seat.

In order to obtain maximum advantage from the construction above defined, the angle of taper of the bearing embodying the slidable outer race is reduced to improve the wedge action, the angle formed by the axes of the tapered rollers and the axis of the spindle being between 5° and 10°.

Preferably also, the average thickness of the tapered part of the slidable outer race is between ten and fifteen-hundredths of the outer radius thereof so that the race is relatively thin and consequently can expand comparatively easily under wedge action of the rollers. The bore of the seat slidably receiving the outer race preferably may exceed the diameter of the outer race by from one to two ten-thousandths of the diameter of this race.

The intermediate portion of reduced mechanical strength may be formed by two circumferentially extending inner and outer grooves which are disposed opposite each other and in cross-sectional shape are in the form of circular arcs, said grooves being interconnected at intervals by radial bores. Lubricant under pressure may be fed to the outer groove from a supply passage.

The rollers of the tapered roller bearing embodying the slidable outer race may be of tubular construction and located in an apertured cage to enable circulation of lubricant through the rollers from one side of the bearing to the other.

The invention is hereinafter described, by way of example, with reference to the accompanying diagrammatic drawings, in which:

FIG. 1 is an axial section illustrating one embodiment of spindle bearing assembly according to the invention;

FIG. 2 is an axial section of a preferred construction of tapered roller bearing used in the assembly of FIG. 1; and FIG. 3 is a plan view of the bearing shown in FIG. 2.

Referring particularly to FIG. 1 of the drawings, a machine tool spindle 1 is provided at the end 1a with a chuck or tool holder (not shown). Near this end the spindle is mounted in the machine frame 2, as is usual, by means of a double tapered roller bearing. This bearing comprises a single outer race 3, which is prevented from rotating by a stud 11 engaging with a notch in the flange 3a of the outer race 3 and with the machine frame 2, and two inner races 4 and 5 corresponding respectively to two sets of tapered rollers 6 and 7. The races 4 and 5 are mounted on the bearing surface 1b of the spindle 1 and are located between a shoulder 1c on the spindle and a clamp nut 8. Lubricant is applied to the bearing by a channel 9 extending through the machine frame, and excess lubricant is returned through a collector 10 associated with a channel 10a.

By careful fitting during manufacture and by accurate adjustment of the position of the nut 8, substantially all play in the double bearing can be eliminated. However, play may arise due either to wear, or to thermal expansion or to forces operative upon the spindle in operation. To compensate for these internal and external causes of play in the spindle bearing, the tall end 1d of the spindle is journalled in the machine frame 2 by means of a second tapered roller bearing which widens towards the end 1d and which exerts a permanent pull on the spindle 1 so that the rollers 7 are pressed tightly against their inner and outer races. The second tapered roller bearing comprises an inner race 12, which is rigidly secured to the spindle by being clamped against a spindle shoulder 1e by a nut 13, an outer race 14 and a set of tapered rollers 15.

As illustrated in FIG. 2, the rollers 15 can, in known manner, be of tubular form and located by a suitably shaped cage 16 of thick metal plate additionally formed with apertures in line with the axial bores in the rollers 15, this cage being retained by a circlip 18 engaging the inner race 12. This construction enables lubricant to circulate through the rollers from one side of the bearing to the other.

The one-piece outer race 14 comprises two parts, a tapered part 14a, the internal periphery of which forms the race surface, and a cylindrical part 14b. The parts 14a, 14b are interconnected by an intermediate part 14c of reduced mechanical strength. This reduction is produced by two grooves 19 and 20 opposite each other and shaped to circular arcs, the part 14c also being formed with radial bores 21 through which lubricant supplied through the channel 22 (FIG. 1) can pass. As in the mounting of the double bearing, lubricant is returned into the machine frame 2 through a channel 24, and collector 23.

The cylindrical part 14b is formed with axial bores 25 receiving springs 26. The latter bear against a plate 27 secured inside the machine frame 2 by screws 28. In this mounting the springs 26 thrust the outer race 14 against the rollers 15 and thereby exert a pull on the spindle 1 which, at its other end, presses the rollers 7 against the outer race 3, thus pre-loading the spindle bearing. Moreover, the flange 3a which abuts against the wall of the machine frame is pressed against said wall by the pull exerted on the spindle, so that finally the thrust of the springs 26 holds in place the whole assembly.

Since the springs 26 are disposed in the bores of the cylindrical part 14b, they can be relatively long, so that slight variations in length cause little change in the thrust applied to the race 14. Also, a very large number of such springs can be provided, as illustrated in FIG. 3, so that the thrust of the springs is distributed very uniformly over the periphery of the race 14.

The rollers 15 bearing against the inner race 12 and pressed against the outer race 14 tend to expand the latter by wedge action when thrust by the springs 26. The invention takes advantage of this wedge action as follows:

The angle of the tapered roller bearing, i.e. the angle α included between the axes of two diametrically opposite rollers 15, i.e. twice the angle formed by the axis of a tapered roller and the axis of the spindle, is given a small value, preferably between 10° and 20°, so that the wedge action is greatly increased. Of course, as in any tapered roller bearing, the generators of the inner and outer races of the rollers 15 also converge at the point A, which is the common apex of the angles α.

The average thickness of the part 14a is between ten and fifteen-hundredths of the outer radius of this race, so that the latter is relatively thin and can consequently be expanded comparatively easily by the wedge action of the rollers.

Finally, the bore of the seat in which the race 14 is disposed in the machine frame 2 is significantly larger than the outside diameter of this race, the difference being one and two ten-thousandths of such diameter. Thus, for example, a race 14 of 120 mm. diameter may be mounted in its bore with a play of two-hundredths of a millimeter.

In this way, without expansion due to the wedge action, the race 14 can slide very freely in its seat and cannot tilt to an extent to hinder its sliding motion, tilting of the race being prevented by its relatively great length, which is substantially as great as its diameter. However, the race 14 expands when thrust by the springs 26 against the rollers 15, and the play between the periphery of the race 14 and the bore in the machine frame becomes negligibly small. The expansion of the race 14 is facilitated by the fact that the part 14a can change its dimension in relation to the part 14b because of the reduced mechanical strength of the intermediate part 14c.

Since the part 14a of the outer race 14 is tightly gripped by the machine frame 2 and since the rollers 15 are pressed against this race by the thrust of the springs 26, which thrust also produces a reaction causing the rollers 7 to be pressed against their two races by an axial force of equal magnitude, all play of the spindle bearings due to the internal and external causes is automatically and permanently obviated.

In the event of axial expansion of the spindle 1, the springs 26 press against the race 14, keeping it in contact with the rollers 15.

During contraction of the spindle 1, the conical assembly formed by the rollers 15 borne by the spindle and the inner race 12 cannot, of course, jam in the race 14 despite the small angle of such assembly, since these rollers run on their races; although the running direction is perpendicular to the wedge direction, this bearing cancels axial friction by its to-and-fro movement.

In addition, the race 14 is lubricated in its seat by lubricant in the outer groove 20, and because of its great length this race cannot jam in its seat. Consequently, the axial thrust acting on the bearing 12, 14, 15 is always equal to the thrust of the springs 26, which thrust varies little since the variation in length is small in relation to the length of the springs 26.

Finally, the following advantages are provided:

(1) Permanent compensation for play which exists or which may be caused by bending or wear in the two end races;

(2) Automatic compensation for play deliberately produced by sliding clearance between the outer race of the rear bearing and its seat;

(3) High stability which obviates any risk of the outer race being jammed in its sliding movement by expansion or contraction of the spindle;

(4) Great simplicity of mounting, the stop for the ring of springs being formed merely by a thrust washer.

It will be understood that the invention is not limited to the particular embodiment hereinbefore described and that the invention may be applied to spindle bearing assemblies in any other suitable manner within the scope of the appended claims.

What I claim is:

1. In a machine tool a spindle bearing assembly comprising a stationary outer race internally provided with a first frusto-conical internal race surface; an axially slidable hollow substantially cylindrical member having a tapered expansible part internally provided with a second frusto-conical internal race surface oppositely flaring with respect to said first race surface, a cylindrical part turned towards said stationary outer race and formed with circumferentially spaced axially directed recesses and an intermediate part of reduced mechanical strength interconnecting said tapered part and said cylindrical part; a spindle coaxially arranged in said outer race and said hollow member; an inner race externally provided with a frusto-conical external race surface fixedly secured on said spindle opposite each internal race surface; a set of tapered rollers between each pair of opposite race surfaces, each roller cooperating with both external and internal surfaces; and a pressure coil spring located in each of said recesses for axially urging said slidable hollow member away from said stationary outer race and expanding said tapered expansible part.

2. In a machine tool having a frame provided with a first and a second bore in coaxial alignment, the combination of an outer race engaging one of said bores and secured therein, said race being internally provided with at least one first frusto-conical internal race surface flaring outwardly with respect to said second bore a hollow substantially cylindrical member slidably fitted in said second bore with a given clearance and having a tapered expansible part internally provided with a second frusto-conical internal race surface oppositely flaring with respect to said first frusto-conical surface, a cylindrical part turned towards said outer race and formed with circumferentially spaced axially directed recesses and an intermediate part of reduced mechanical strength interconnecting said tapered part and said cylindrical part; a spindle coaxially arranged in said outer race and said hollow member; an inner race externally provided with a frusto-conical race surface fixedly secured on said spindle opposite each internal race surface; a set of tapered rollers between each pair of opposite race surfaces, each roller cooperating with both external and internal surfaces; a pressure coil spring located in each of said recesses having one end abutting against the bottom of said recess and the other end projecting out of said recess; and a ring member coaxially fitted with respect to said spindle, secured to said machine frame and in abutment relationship with said spring outer ends for keeping said springs in pressure condition whereby said hollow member is urged away from said race and the expansible part is expanded for at least substantially reducing said clearance.

3. A spindle bearing assembly according to claim 1, wherein the angle formed by the axes of the tapered roller cooperating with the internal race surface carried by said tapered expansible part and the axis of the spindle is between 5° and 10°, and wherein the average thickness of said tapered part is between ten and fifteen-hundredths of the outer radius thereof.

4. A combination according to claim 2, wherein said second bore exceeds the outer diameter of said hollow member fitted therein by from one to two ten-thousandths of the outer diameter of said hollow member.

5. A spindle bearing assembly according to claim 1, wherein said intermediate portion of reduced mechanical strength is formed by two circumferentially extending inner and outer grooves which are disposed opposite each other and arcuate in cross-sectional shape, said groove being interconnected at intervals by radial bores.

6. A spindle bearing assembly according to claim 1, wherein at least the rollers cooperating with said internal race surface of said tapered part are of tubular structure having passages and further comprising a cage for housing said rollers, having said cage apertures registering with said passages of said rollers such that a lubricant may circulate through the rollers from one side to the other.

References Cited in the file of this patent
UNITED STATES PATENTS

| | | |
|---|---|---|
| 1,444,751 | Mueller | Feb. 6, 1923 |
| 1,881,750 | Llewellyn | Oct. 11, 1932 |
| 1,982,366 | Baninger | Nov. 27, 1934 |
| 2,314,622 | Klamp | Mar. 23, 1943 |
| 2,649,337 | Ware | Aug. 18, 1953 |
| 2,894,790 | Rudnicki | July 14, 1959 |
| 2,973,136 | Greenwald | Feb. 28, 1961 |